United States Patent
Hoffner et al.

(10) Patent No.: US 10,645,753 B1
(45) Date of Patent: May 5, 2020

(54) SYSTEMS AND METHODS FOR PROVIDING INDICATIONS OF NETWORK CONNECTIVITY STATUS TO A USER DEVICE

(71) Applicant: Verizon Patent and Licensing Inc., Arlington, VA (US)

(72) Inventors: Barry F. Hoffner, Bridgewater, NJ (US); Javier A. Ferro, Somerset, NJ (US); Lixia Yan, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/248,168

(22) Filed: Jan. 15, 2019

(51) Int. Cl.
*H04W 88/06* (2009.01)
*H04W 64/00* (2009.01)
*H04W 4/02* (2018.01)
*H04M 15/00* (2006.01)
*H04W 8/04* (2009.01)
*H04W 8/08* (2009.01)
*H04L 12/26* (2006.01)
*H04L 12/66* (2006.01)
*H04W 4/24* (2018.01)

(52) U.S. Cl.
CPC ............. *H04W 88/06* (2013.01); *H04L 12/66* (2013.01); *H04L 43/0811* (2013.01); *H04M 15/66* (2013.01); *H04M 15/852* (2013.01); *H04W 8/04* (2013.01); *H04W 8/08* (2013.01); *H04W 4/24* (2013.01)

(58) Field of Classification Search
CPC .......................... H04W 4/00; H04W 4/02–025
See application file for complete search history.

(56) References Cited

U.S. PATENT DOCUMENTS

| | | | | |
|---|---|---|---|---|
| 9,906,992 | B1* | 2/2018 | Youtz | H04W 36/0033 |
| 2008/0242299 | A1* | 10/2008 | Edwards | H04W 12/06 455/435.2 |
| 2013/0231080 | A1* | 9/2013 | Cheuk | H04M 15/765 455/405 |
| 2015/0341830 | A1* | 11/2015 | Jeong | H04W 24/02 370/329 |
| 2019/0053136 | A1* | 2/2019 | Lee | H04M 1/72519 |
| 2019/0268833 | A1* | 8/2019 | Kwok | H04W 16/14 |
| 2019/0268962 | A1* | 8/2019 | Wang | H04B 7/02 |
| 2019/0379469 | A1* | 12/2019 | Lu | H04W 24/10 |

\* cited by examiner

*Primary Examiner* — San Htun

(57) ABSTRACT

A device receives, from a user device, a connection request for connecting to a core network associated with the device, and determines, based on receiving the connection request, that a usage associated with the user device exceeds a usage threshold. The device generates a first network connectivity status indicator based on determining that the usage associated with the user device exceeds the usage threshold, and provides, to the user device, information indicating the first network connectivity status indicator. The information indicating the first network connectivity status indicator is to cause the user device to display the first network connectivity status indicator.

20 Claims, 10 Drawing Sheets

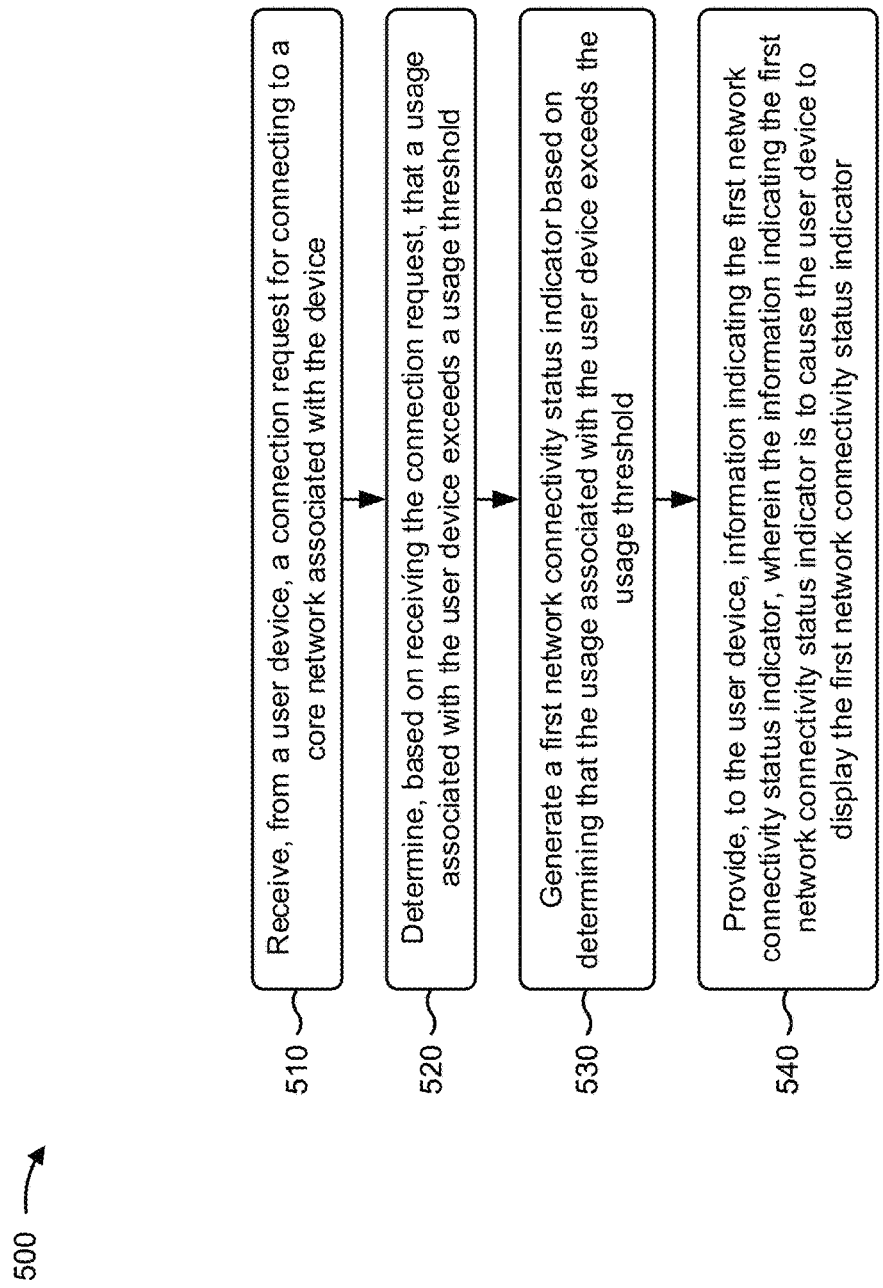

SYSTEMS AND METHODS FOR PROVIDING INDICATIONS OF NETWORK CONNECTIVITY STATUS TO A USER DEVICE

BACKGROUND

A user device (e.g., user equipment or UE) may utilize a network (e.g., a cellular network) based on accessing the network. For example, the user device may have access to different networks, such as a third generation (3G) network, a fourth generation (4G) or long-term evolution (LTE) network, a fifth generation (5G) network, and/or the like.

BRIEF DESCRIPTION OF THE DRAWINGS

FIG. 5 is a flow chart of an example process for providing indications of network connectivity status to a user device.

DETAILED DESCRIPTION OF PREFERRED EMBODIMENTS

Figure 1A:
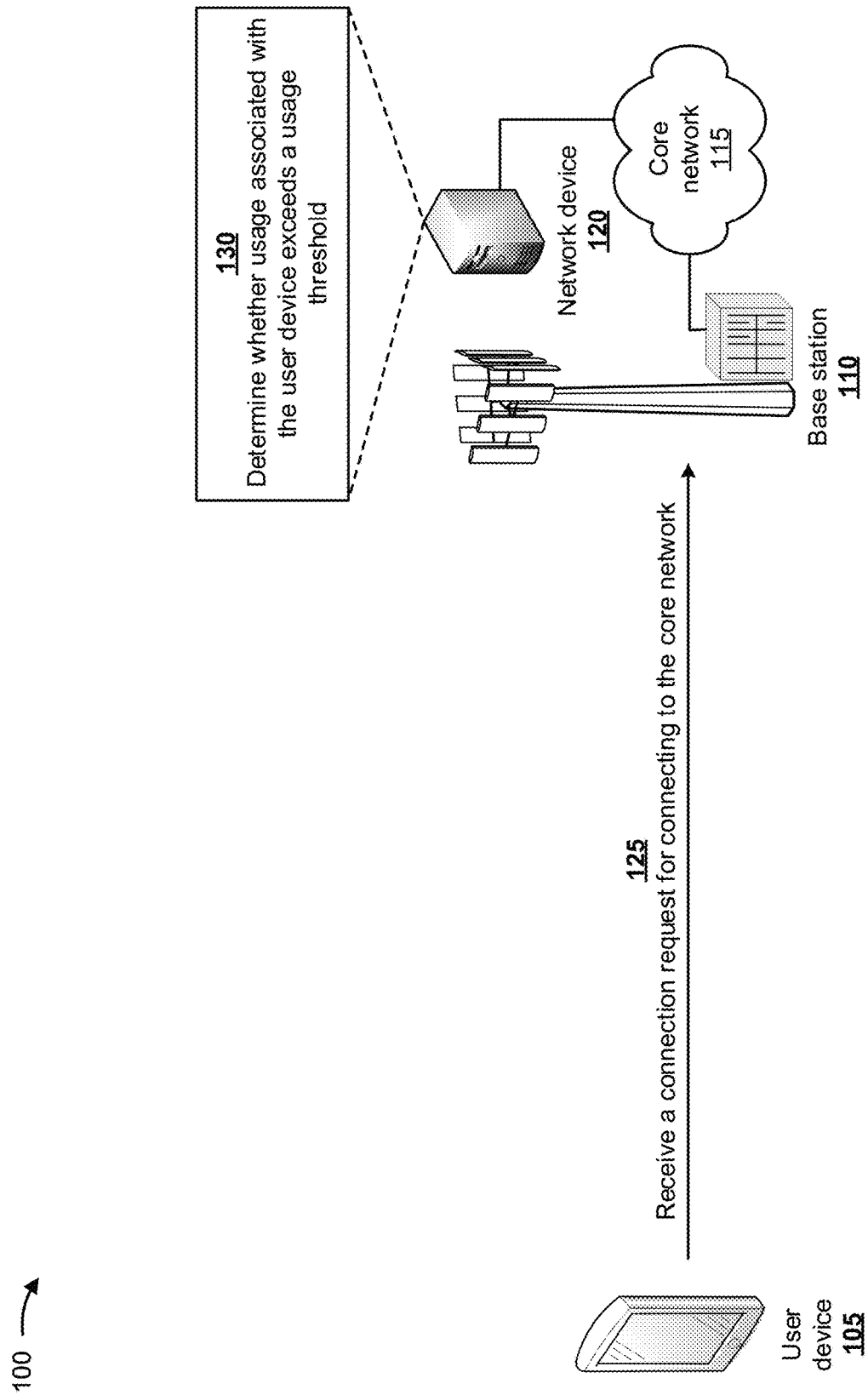
FIGS. 1A-1F are diagrams of an example implementation described herein.

The following detailed description of example implementations refers to the accompanying drawings. The same reference numbers in different drawings may identify the same or similar elements.

A network connectivity status is an indicator (e.g., displayed by a user device) that shows whether the user device is connected to a mobile network provided by a telecommunications provider. For example, the network connectivity status indicator provides information indicating whether the user device is currently utilizing a roaming service (e.g., indicated by an "R" or a "Δ"), a 3G network (e.g., indicated by a "3G"), a 4G LTE network (e.g., indicated by a "4G LTE"), a 1× network (e.g., indicated by a "1×"), a 5G network (e.g., indicated by a "5G"). The user device may receive information (e.g., a value of a radio access type) from a radio access network (RAN), and displays a network connectivity status indicator (e.g., based on the received information) on a user interface of the user device.

Telecommunications providers may offer several usage plans that are capped at specific usage limits (e.g., in gigabytes (GB) of data per month). If customers reach these usage limits, the telecommunications providers may throttle or slow customer data speeds. However, when a user device is throttled to a slower data speed, the network connectivity status indicator on the user device may still display either "4G LTE" or "5G," for example, which may result in customer confusion and may cause the customers to contact customer service.

Some implementations described herein provide a device (e.g., a network device that is separate from or part of a core network) that provides indications of network connectivity status to a user device. For example, the device may receive, from a user device, a connection request for connecting to a core network associated with the device, and may determine, based on receiving the connection request, whether a usage associated with the user device exceeds a usage threshold. The device may generate one of a first network connectivity status indicator or a second network connectivity status indicator based on whether the usage associated with the user device exceeds the usage threshold (e.g., or based on subscriber and/or core network information, such as a subscriber price plan, a subscriber location, a subscriber data usage, a core network condition, and/or the like). The first network connectivity status indicator may be generated when the usage associated with the user device fails to exceed the usage threshold, and the second network connectivity status indicator may be generated when the usage associated with the user device exceeds the usage threshold. The device may provide, to the user device, information indicating the one of the first network connectivity status indicator or the second network connectivity status indicator. The information indicating the one of the first network connectivity status indicator or the second network connectivity status indicator may cause the user device to display the one of the first network connectivity status indicator or the second network connectivity status indicator.

In this way, the device provides an intelligent way for a core network to provide an indication to a user device with a data speed that is throttled (e.g., due to reaching a usage threshold for the user device, for an account associated with the user device, for an account associated with the user device and one or more other user devices, and/or the like) or restricted in some other way (e.g., near data capacity, slower intermediate speeds, public safety restrictions, located in 5G radio network coverage but only receiving 4G radio network service, displayed video is being shaped to standard definition, receiving a different quality of service, and/or the like). The user device interprets this indication and displays a network connectivity status indicator indicating the throttled data speed. The network connectivity status indicator enables a customer, associated with the user device, to understand that the data speed and/or other factors for the user device is reduced or throttled. This conserves resources (e.g., processing resources, memory resources, and/or the like) that would otherwise be wasted in addressing customer support questions associated with the throttled data speed. When a new billing cycle starts or when a restriction is lifted, the data speed throttle is removed by the core network and the core network provides another indication indicating that the data speed for the user device is not reduced or throttled or that the restriction is lifted. The user device interprets the other indication and displays a network connectivity status indicator indicating that the data speed is not reduced or throttled or that the restriction is lifted.

FIGS. 1A-1F are diagrams of an example implementation 100 described herein. As shown in FIG. 1A, a user device 105 may wish to access a base station 110 and a core network 115 with an associated network device 120. As further shown in FIG. 1A, user device 105 may establish a connection (e.g., a radio resource control (RRC) connection) with base station 110 of core network 115 by generating a connection request for connecting to core network 115. In some implementations, base station 110 may broadcast a signal, and user device 105 may receive the signal and may establish a connection with base station 110 based on receiving the signal.

In some implementations, core network 115 may include a fourth generation (4G) network or a fifth generation (5G) network. In such implementations, network device 120 may include a packet data network gateway (PGW). In some implementations, core network 115 may include is a 5G network. In such implementations, network device 120 may include a session management function (SMF) device.

As further shown in FIG. 1A, and by reference number 125, network device 120 may receive, from user device 105 and via base station 110 and/or core network 115, the connection request for connecting to core network 115. In some implementations, the connection request may include information identifying user device 105 (e.g., a mobile device identifier (ID), such as a unique device ID, an Android device ID, a telephone number, a serial number, and/or the like), information indicating capabilities of user device 105 (e.g., a 4G device, a 5G device, and/or the like), information indicating an account associated with user device 105 (e.g., an account indicating that user device 105 shares a data usage plan with other user devices 105, not shown), and/or the like.

As further shown in FIG. 1A, and by reference number 130, network device 120 may determine whether any restrictions associated with user device 105 are present (e.g., usage associated with user device 105 satisfies (e.g., exceeds) a usage threshold). In some implementations, the usage threshold may be associated with data usage of core network 115 by user device 105, for an account associated with user device 105, for an account associated with user device 105 and one or more other user devices, and/or the like. In some implementations, the usage threshold may be associated with data usage of core network 115 for a particular time period (e.g., a day, a week, a month, multiple months, and/or the like).

In some implementations, if user device 105 and/or the account associated with user device 105 satisfies the usage threshold before the particular time period expires (e.g., in gigabytes (GB) of data per month), core network 115 may throttle or slow data speeds for user device 105. For example, if user device 105 is associated with an account that provides twenty-five (25) GB per month of data for user device 105 and another user device, and user device 105 and the other user device utilize twenty-five (GB) of data in twenty days, data speeds for user device 105 and the other user device may be throttled, by core network 115, for the remaining days of the month.

Figure 1B:
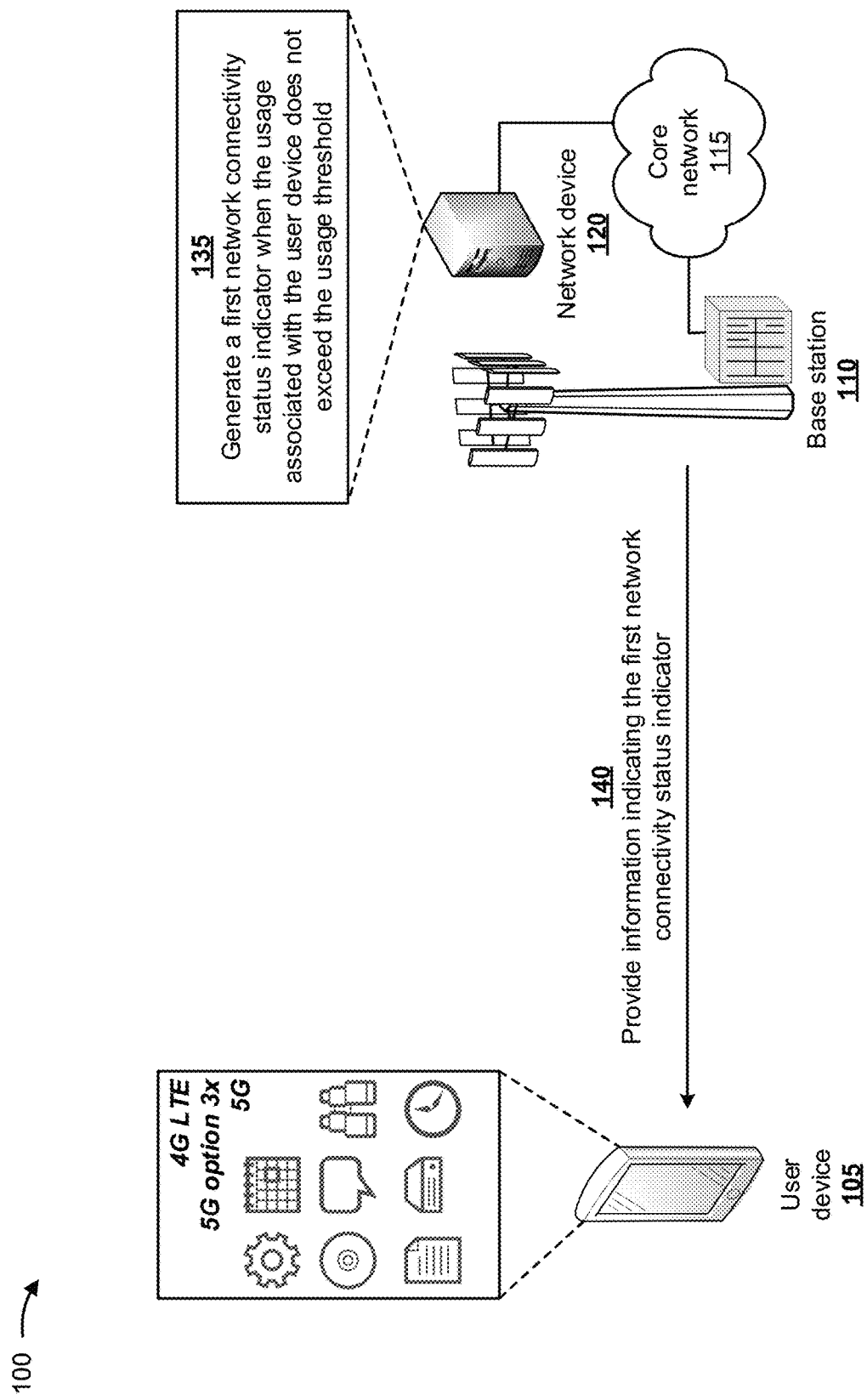

As shown in FIG. 1B, and by reference number 135, network device 120 (e.g., a core network device) may generate a first network connectivity status indicator when the usage associated with user device 105 does not satisfy (e.g., does not exceed) the usage threshold. In some implementations, the first network connectivity status indicator may include information indicating that network data speeds for user device 105 with core network 115 is not throttled. In some implementations, the first network connectivity status indicator may include a first protocol configuration option (PCO) container value (e.g., a value of "0" or "1").

As further shown in FIG. 1B, and by reference number 140, network device 120 may provide, or cause to be provided, to user device 105, information indicating the first network connectivity status indicator. In some implementations, the information indicating the first network connectivity status indicator (e.g., the first PCO container value) may be included in a non-access stratum (NAS) message. In some implementations, the NAS message may include an active default bearer message (e.g., when core network 115 is a 4G network or a 5G option 3× network). In some implementations, the information indicating the first network connectivity status indicator (e.g., the first PCO container value) may be included in a protocol data unit (PDU) session resource message (e.g., when core network 115 is a 5G network). User device 105 may receive the information indicating the first network connectivity status indicator, and may display (e.g., to a user) information indicating that network data speeds for user device 105 with core network 115 is not throttled (e.g., "4G LTE," "5G option 3×," "5G," and/or the like).

Figure 1C:
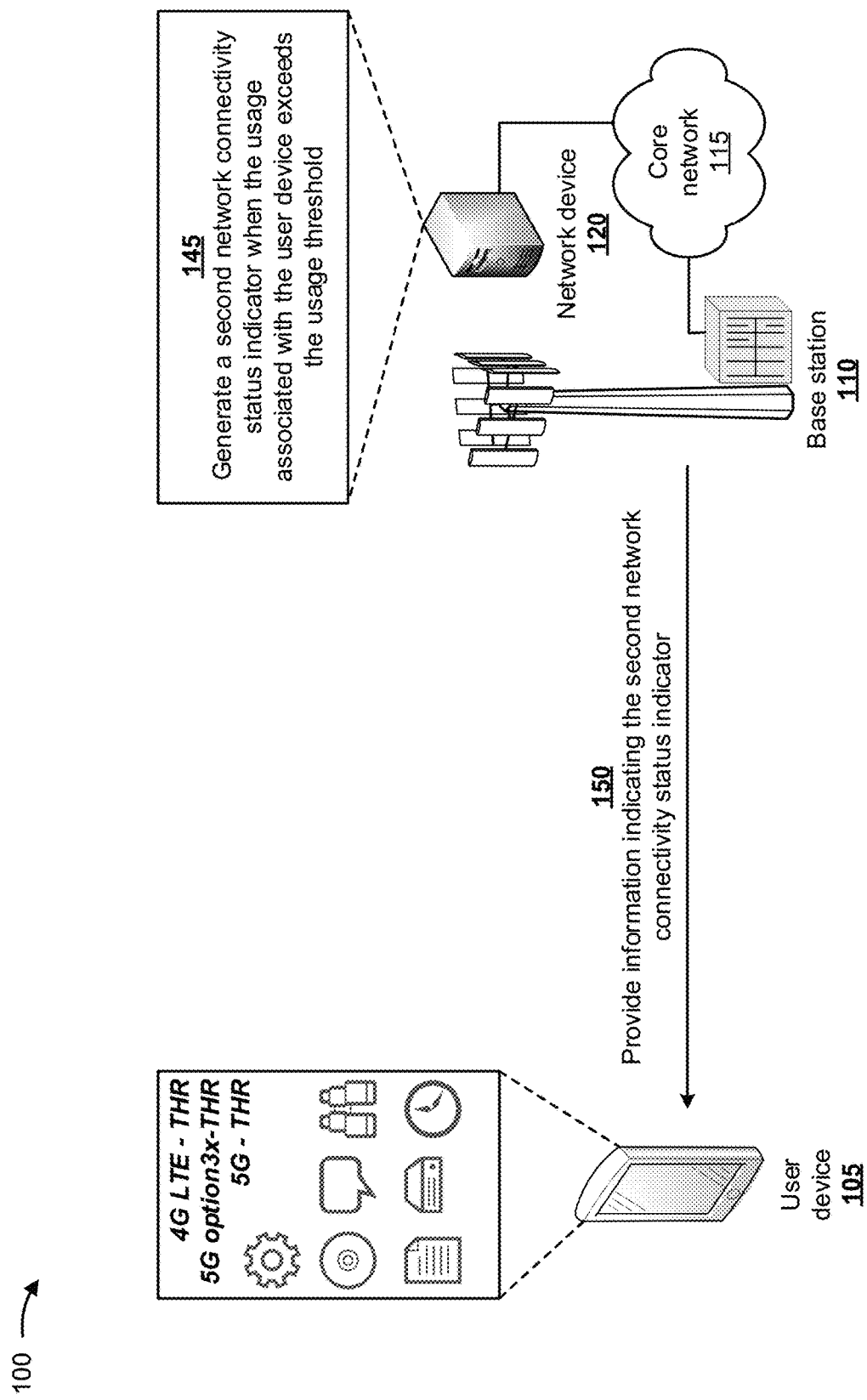

As shown in FIG. 1C, and by reference number 145, network device 120 may generate a second network connectivity status indicator when the usage associated with user device 105 satisfies (e.g., exceeds) the usage threshold. In some implementations, the second network connectivity status indicator may include information indicating that network data speeds for user device 105 with core network 115 is throttled. In some implementations, the second network connectivity status indicator may include a second PCO container value (e.g., a value of "1" or "0") that is different than the first PCO container value (e.g., a value of "0" or "1").

As further shown in FIG. 1C, and by reference number 150, network device 120 may provide, or cause to be provided, to user device 105, information indicating the second network connectivity status indicator. In some implementations, the information indicating the second network connectivity status indicator (e.g., the second PCO container value) may be included in a NAS message. In some implementations, the NAS message may include an active default bearer message (e.g., when core network 115 is a 4G network or a 5G option 3× network). In some implementations, the information indicating the second network connectivity status indicator (e.g., the second PCO container value) may be included in a PDU session resource message (e.g., when core network 115 is a 5G network). User device 105 may receive the information indicating the second network connectivity status indicator, and may display (e.g., to a user) information indicating that network data speeds for user device 105 with core network 115 is throttled (e.g., "4G LTE-THR," "5G option 3×-THR," "5G-THR," and/or the like). In this example, "THR" represents a visual indication, to the user, that network data speeds are currently being throttled.

In some implementations, the usage associated with user device 105 may change over time, and network device 120 may change the network connectivity status indicator based on the usage change associated with user device 105. For example, assume that network device 120 provides, or causes to be provided, to user device 105, information indicating the first network connectivity status indicator (e.g., indicating that network data speeds for user device 105 with core network 115 is not throttled), and that the usage change associated with user device 105 exceeds the usage threshold (e.g., before expiration of the particular time period). In such an example, network device 120 may provide, or cause to be provided, to user device 105, information indicating the second network connectivity status indicator (e.g., indicating that network data speeds for user device 105 with core network 115 is throttled). In another example, assume that network device 120 provides, or causes to be provided, to user device 105, information indicating the second network connectivity status indicator (e.g., indicating that network data speeds for user device 105 with core network 115 is throttled), and that the particular time period expires. In such an example, network device 120 may provide, or cause to be provided, to user device 105, information indicating the first network connectivity status indicator (e.g., indicating that network data speeds for user device 105 with core network 115 is not throttled).

Figure 1D:
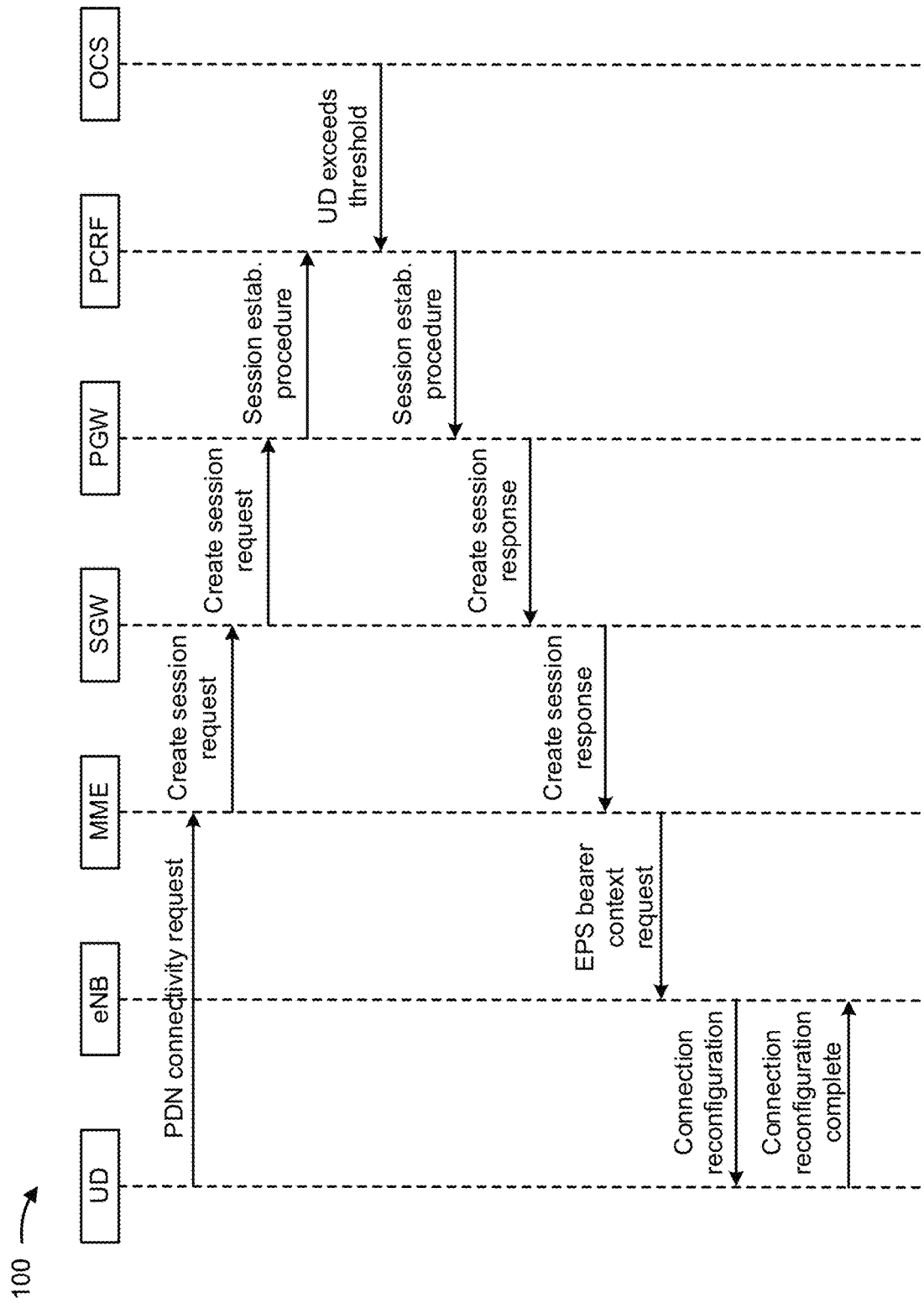

FIG. 1D may provide an example flow for when core network 115 is a 4G network. As shown in FIG. 1D, user device 105 may provide a packet data network (PDN) connectivity request to a mobility management entity device (MME) of the 4G network. The MME may provide a create session request to a serving gateway (SGW) of the 4G network. The SGW may provide the create session request to a packet data network gateway (PGW) of the 4G network. The PGW may begin a session establishment procedure with a policy and charging rules function (PCRF) of the 4G network. The PCRF may receive, from an online charging system (OCS) of the 4G network, an indication that usage associated with user device 105 exceeds the usage threshold.

As further shown in FIG. 1D, based on the indication that usage associated with user device 105 exceeds the usage threshold, the PCRF may request (e.g., via the session establishment procedure) that the PGW utilize the second network connectivity status indicator (e.g., indicating that network data speeds for user device 105 with core network 115 is throttled). The PGW may include the second PCO container value in a create session response and may provide the create session response to the SGW. The SGW may provide the create session response to the MME. The MME may receive the create session response message, may include the second PCO container value in an activate default evolved packet system (EPS) bearer context NAS message, and may provide the activate default EPS bearer context NAS message to base station 110. Base station 110 may provide, to user device 105, an RRC connection reconfiguration message that includes the activate default EPS bearer context NAS message. User device 105 may receive the activate default EPS bearer context NAS message, may interpret the second PCO container value, and may display information indicating that network data speeds for user device 105 with the 4G network is throttled (e.g., "4G LTE-THR").

Figure 1E:
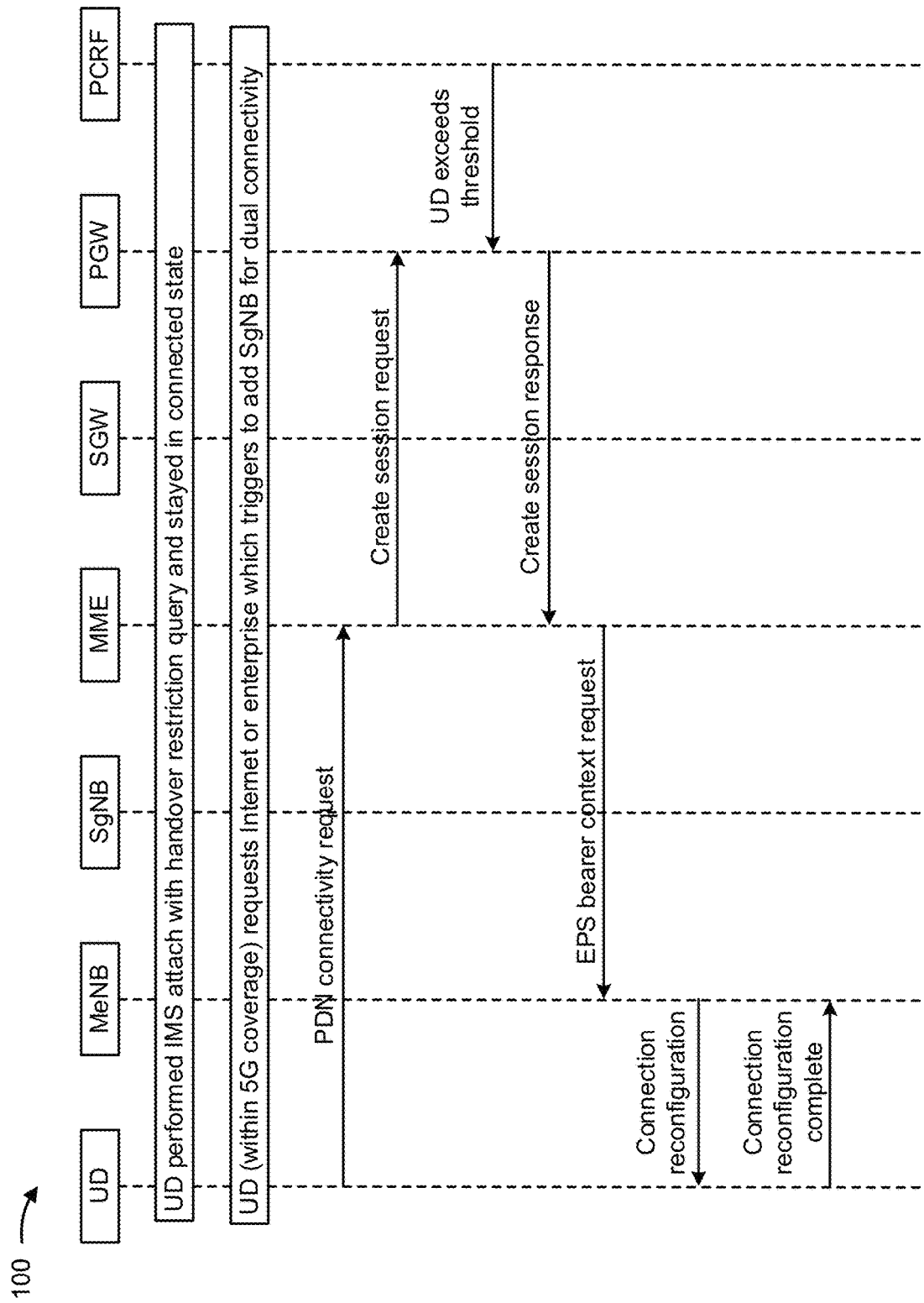

FIG. 1E may provide an example flow for when core network 115 is a 5G option 3× network. As shown in FIG. 1E, user device 105 may perform an Internet protocol (IP) multimedia subsystem (IMS) attach with a handover restriction query and may stay in a connected state. User device 105 may be within coverage of the 5G network (e.g., a 5G option 3× network) and may request an Internet or an enterprise application programming interface (API), which triggers addition of a secondary base station 110 (e.g., SgNB) with a master base station 110 (e.g., MeNB). As further shown in FIG. 1E, user device 105 may provide a PDN connectivity request to a MME of the 5G option 3× network. The MME may provide a create session request to a PGW of the 5G option 3× network. A PCRF of the 5G option 3× network may provide, to the PGW, an indication that usage associated with user device 105 exceeds the usage threshold. Based on the indication that usage associated with user device 105 exceeds the usage threshold, the PCRF may request that the PGW utilize the second network connectivity status indicator (e.g., indicating that network data speeds for user device 105 with core network 115 is throttled).

As further shown in FIG. 1E, the PGW may include the second PCO container value in a create session response and may provide the create session response to the MME. The MME may receive the create session response message, may include the second PCO container value in an activate default evolved packet system (EPS) bearer context NAS message, and may provide the activate default EPS bearer context NAS message to base station 110 (e.g., MeNB). Base station 110 may provide, to user device 105, an RRC connection reconfiguration message that includes the activate default EPS bearer context NAS message. User device 105 may receive the activate default EPS bearer context NAS message, may interpret the second PCO container value, and may display information indicating that network data speeds for user device 105 with the 5G option 3× network is throttled (e.g., "5G option 3×-THR").

Figure 1F:
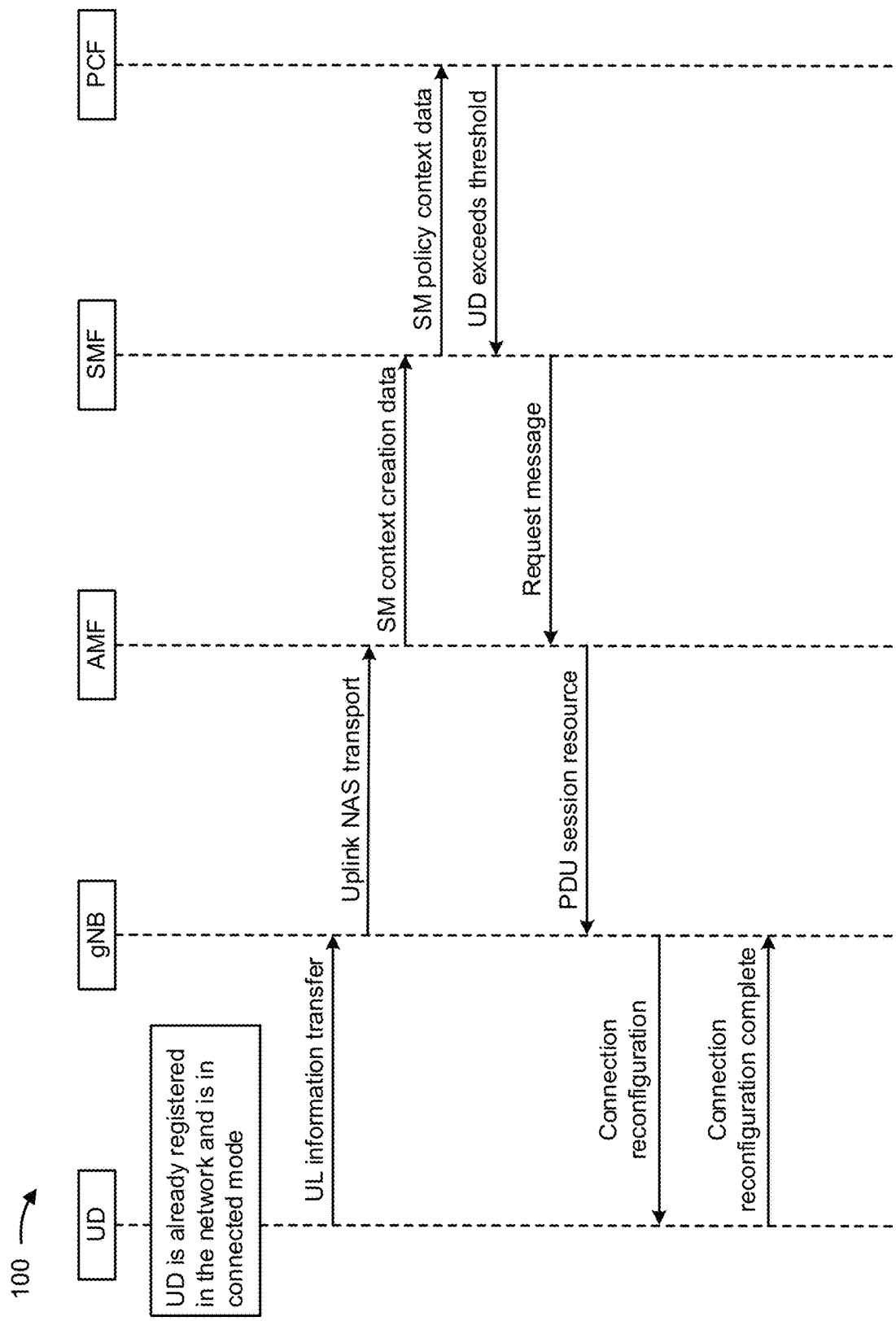

FIG. 1F may provide an example flow for when core network 115 is a 5G network. As shown in FIG. 1F, user device 105 may be already registered in the 5G network and may be in a connected mode. User device 105 may provide an uplink (UL) information transfer to base station 110 (e.g., gNB), and base station 110 may provide an uplink NAS transport message to an access and mobility management function (AMF) of the 5G network. The AMF may provide session management (SM) context creation data to a session management function (SMF) of the 5G network, and the SMF may provide session management (SM) policy context data to a policy control function (PCF) of the 5G network. The PCF may provide, to the SMF, an indication that usage associated with user device 105 exceeds the usage threshold. Based on the indication that usage associated with user device 105 exceeds the usage threshold, the PCF may request that the SMF utilize the second network connectivity status indicator (e.g., indicating that network data speeds for user device 105 with core network 115 is throttled).

As further shown in FIG. 1F, the SMF may include the second PCO container value in a request message and may provide the request message to the AMF. The AMF may receive the request message, may include the second PCO container value in a protocol data unit (PDU) session resource message, and may provide the PDU session resource message to base station 110 (e.g., gNB). Base station 110 may provide, to user device 105, an RRC connection reconfiguration message that includes the PDU session resource message. User device 105 may receive the PDU session resource message, may interpret the second PCO container value, and may display information indicating that network data speeds for user device 105 with the 5G network is throttled (e.g., "5G-THR").

In some implementations, core network 115 may provide other indications to user device 105, such as an indication indicating that a public safety user of user device 105 (e.g., an emergency responder) is in an area (e.g., a location of the emergency) where restrictions are lifted; an indication indicating that user device 105 is located in 5G radio network coverage but is only receiving 4G radio network service; an indication indicating that video displayed by user device 105 is being shaped to standard definition (e.g., from high definition); an indication indicating that user device 105 is receiving a different quality of service (e.g., a de-prioritized quality of service); and/or the like.

In this way, network device 120 provides an intelligent way for core network 115 to provide an indication to user device 105 with a data speed that is throttled. User device 105 interprets this indication and displays a network connectivity status indicator indicating the throttled data speed. The network connectivity status indicator enables a customer, associated with user device 105, to understand that the data speed for user device 105 is throttled. This conserves resources (e.g., processing resources, memory resources, and/or the like) that would otherwise be wasted in addressing customer support questions associated with the throttled data speed. Furthermore, currently there does not exist a technique that enables a network device of a core network to provide indications of network connectivity status to a user device.

As indicated above, FIGS. 1A-1F are provided merely as examples. Other examples may differ from what was described with regard to FIGS. 1A-1F. The number and arrangement of devices and networks shown in FIGS. 1A-1F are provided as an example. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of FIGS. 1A-1F may perform one or more functions described as being performed by another set of devices of FIGS. 1A-1F.

Figure 2:
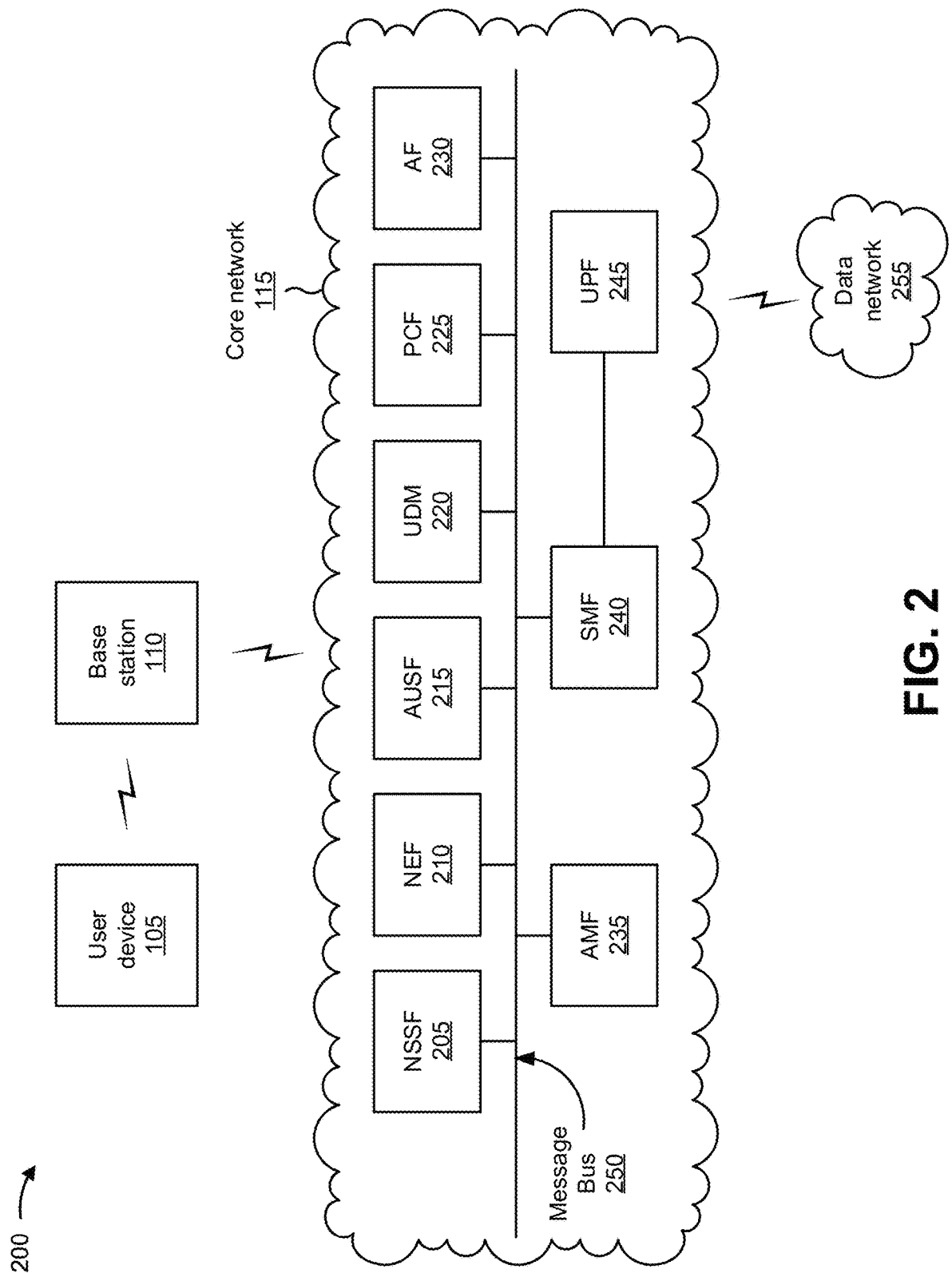
FIGS. 2 and 3 are diagrams of example environments in which systems and/or methods described herein may be implemented.

FIG. 2 is a diagram of an example environment 200 in which systems and/or methods described herein may be implemented. As shown in FIG. 2, example environment 200 may include user device 105, base station 110, core network 115, and a data network 255. Devices and/or networks of example environment 200 may interconnect via wired connections, wireless connections, or a combination of wired and wireless connections.

User device 105 includes one or more devices capable of receiving, generating, storing, processing, and/or providing information, such as information described herein. For example, user device 105 can include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, etc.), a mobile hotspot device, a fixed wireless access device, customer premises equipment, an autonomous vehicle, or a similar type of device. In some implementations, user device 105 can receive information from and/or transmit information to base station 110.

Base station 110 includes one or more devices capable of communicating with user device 105 using a cellular radio access technology (RAT). For example, base station 110 may include a base transceiver station, a radio base station, a node B, an eNodeB (eNB), a gNodeB (gNB), a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 110 may transfer traffic between user device 105 (e.g., using a cellular RAT), other base stations 110 (e.g., using a wireless interface or a backhaul interface, such as a wired backhaul interface), and/or core network 115. Base station 110 may provide one or more cells that cover geographic areas. Some base stations 110 may be mobile base stations. Some base stations 110 may communicate using multiple RATs.

In some implementations, base station 110 may perform scheduling and/or resource management for user devices 105 covered by base station 110 (e.g., user devices 105 covered by a cell provided by base station 110). In some implementations, base station 110 may be controlled or coordinated by a network controller, which may perform load balancing, network-level configuration, and/or the like. The network controller may communicate with base station 110 via a wireless or wireline backhaul. In some implementations, base station 110 may include a network controller, a self-organizing network (SON) module or component, or a similar module or component. In other words, base station 110 may perform network control, scheduling, and/or network management functions (e.g., for other base stations 110 and/or for uplink, downlink, and/or sidelink communications of user devices 105 covered by the base station 110). In some implementations, base station 110 may include a central unit and multiple distributed units. The central unit may coordinate access control and communication with regard to the multiple distributed units. The multiple distributed units may provide user devices 105 and/or other base stations 110 with access to data network 255 via the core network.

In some implementations, core network 115 may include an example functional architecture in which systems and/or methods, described herein, may be implemented. For example, core network 115 may include an example architecture of a 5G next generation (NG) core network included in a 5G wireless telecommunications system. While the example architecture of core network 115 shown in FIG. 2 may be an example of a service-based architecture, in some implementations, core network 115 may be implemented as a reference-point architecture.

As shown in FIG. 2, core network 115 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, a user plane function (UPF) 245, and/or the like. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 205 includes one or more devices that select network slice instances for user device 105. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating user devices 105 in the wireless telecommunications system.

UDM 220 includes one or more devices that store user data and profiles in the wireless telecommunications system. UDM 220 may be used for fixed access, mobile access, and/or the like, in core network 115.

PCF 225 includes one or more devices that provide a policy framework that incorporates network slicing, roaming, packet processing, mobility management, and/or the like.

AF 230 includes one or more devices that support application influence on traffic routing, access to NEF 210, policy control, and/or the like.

AMF 235 includes one or more devices that act as a termination point for non-access stratum (NAS) signaling, mobility management, and/or the like.

SMF 240 includes one or more devices that support the establishment, modification, and release of communications sessions in the wireless telecommunications system. For example, SMF 240 may configure traffic steering policies at UPF 245, enforce user device IP address allocation and policies, and/or the like.

UPF 245 includes one or more devices that serve as an anchor point for intraRAT and/or interRAT mobility. UPF 245 may apply rules to packets, such as rules pertaining to packet routing, traffic reporting, handling user plane QoS, and/or the like.

Message bus 250 represents a communication structure for communication among the functional elements. In other words, message bus 250 may permit communication between two or more functional elements.

Data network 255 includes one or more wired and/or wireless data networks. For example, data network 255 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
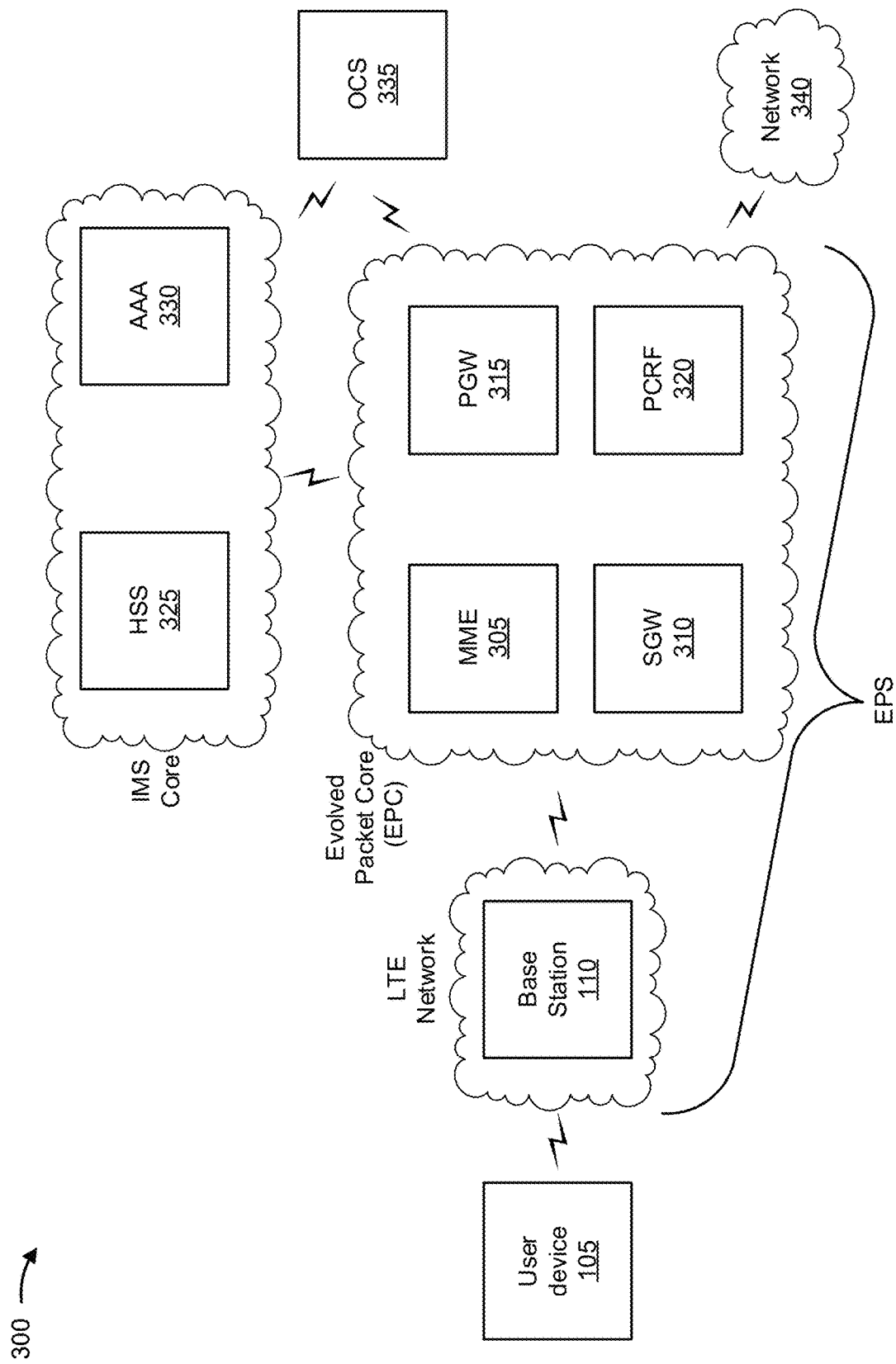

FIG. 3 is a diagram of an example environment 300 in which systems and/or methods described herein may be implemented. As shown in FIG. 3, environment 300 may include user device 105; base station 110; a mobility management entity device (MME) 305; a serving gateway (SGW) 310; a packet data network gateway (PGW) 315; a policy and charging rules function (PCRF) 320; a home subscriber server (HSS) 325; an authentication, authorization, and accounting server (AAA) 330; an online charging system (OCS) 335; and a network 340. Devices of environment 300 may interconnect via wired connections, wireless connections, or a combination of wired and wireless connections.

Some implementations are described herein as being performed within a LTE network or a 5G network for explanatory purposes. Some implementations may be performed within a network that is not an LTE network or a 5G network, such as a 3G network.

Environment 300 may include an evolved packet system (EPS) that includes an LTE network and/or an evolved packet core (EPC) (e.g., core network 115) that operate based on a third-generation partnership project (3GPP) wireless communication standard. The LTE network may include a radio access network (RAN) that includes one or more base stations 110 that take the form of evolved Node Bs (eNBs) via which user device 105 communicates with the EPC. The EPC may include MME 305, SGW 310, and/or PGW 315 that enable user device 105 to communicate with network 340 and/or an Internet protocol (IP) multimedia subsystem (IMS) core. The IMS core may include HSS 325 and/or AAA 330, and may manage device registration and authentication, session initiation, etc., associated with user devices 105. HSS 325 and/or AAA 330 may reside in the EPC and/or the IMS core.

User device 105 includes the features described above in connection with FIG. 2. In some implementations, user device 105 may send traffic to and/or receive traffic from network 340 (e.g., via base station 110, SGW 310, and/or PGW 315).

Base station 110 includes the features described above in connection with FIG. 2. In some implementations, base station 110 may send traffic to and/or receive traffic from user device 105 via an air interface.

MME 305 includes one or more devices, such as one or more server devices, capable of managing authentication, activation, deactivation, and/or mobility functions associated with user device 105. In some implementations, MME 305 may perform operations relating to authentication of user device 105. Additionally, or alternatively, MME 305 may facilitate the selection of a particular SGW 310 and/or a particular PGW 315 to serve traffic to and/or from user device 105. MME 305 may perform operations associated with handing off user device 105 from a first base station 110 to a second base station 110 when user device 105 is transitioning from a first cell associated with the first base station 110 to a second cell associated with the second base station 110. Additionally, or alternatively, MME 305 may select another MME (not pictured), to which user device 105 should be handed off (e.g., when user device 105 moves out of range of MME 305).

SGW 310 includes one or more devices capable of routing packets. For example, SGW 310 may include one or more data processing and/or traffic transfer devices, such as a gateway, a router, a modem, a switch, a firewall, a network interface card (MC), a hub, a bridge, a server device, an optical add/drop multiplexer (OADM), or any other type of device that processes and/or transfers traffic. In some implementations, SGW 310 may aggregate traffic received from one or more base stations 110 associated with the LTE network, and may send the aggregated traffic to network 340 (e.g., via PGW 315) and/or other network devices associated with the EPC and/or the IMS core. SGW 310 may also receive traffic from network 340 and/or other network devices, and may send the received traffic to user device 105 via base station 110. Additionally, or alternatively, SGW 310 may perform operations associated with handing off user device 105 to and/or from an LTE network.

PGW 315 includes one or more devices capable of providing connectivity for user device 105 to external packet data networks (e.g., other than the depicted EPC and/or LTE network). For example, PGW 315 may include one or more data processing and/or traffic transfer devices, such as a gateway, a router, a modem, a switch, a firewall, a MC, a hub, a bridge, a server device, an OADM, or any other type of device that processes and/or transfers traffic. In some implementations, PGW 315 may aggregate traffic received from one or more SGWs 310, and may send the aggregated traffic to network 340. Additionally, or alternatively, PGW 315 may receive traffic from network 340, and may send the traffic to user device 105 via SGW 310 and base station 110. PGW 315 may record data usage information (e.g., byte usage), and may provide the data usage information to AAA 330.

PCRF 320 includes one or more devices capable of storing user information, such as voice call and data rate plans or quotas for users (e.g., users of environment 300). PCRF 320 may provide network control regarding service data flow detection, gating, quality of service (QoS), and/or flow-based charging. Policies and rules regarding QoS may include policies and rules instructing user device 105 and network elements (base station 110, MME 305, SGW 310, PGW 315, etc.) to minimize packet loss, to implement a packet delay budget, to provide a guaranteed bit rate (GBR), to provide low latency, and/or to perform other activities associated with QoS. PCRF 320 may provide policies and rules to other network devices, such as HSS 325 AAA 330, to implement network control. PCRF 320 may determine how a certain service data flow shall be treated, and may ensure that user plane traffic mapping and QoS is in accordance with a user's profile and/or network policies.

HSS 325 includes one or more devices, such as one or more server devices, capable of managing (e.g., receiving, generating, storing, processing, and/or providing) information associated with user device 105. For example, HSS 325 may manage subscription information associated with user device 105, such as information that identifies a user profile of a user associated with user device 105, information that identifies services and/or applications that are accessible to user device 105, location information associated with user device 105, a network identifier (e.g., a network address) that identifies user device 105, information that identifies a treatment of user device 105 (e.g., quality of service information, a quantity of minutes allowed per time period, a quantity of data consumption allowed per time period, etc.), and/or similar information. HSS 325 may provide this information to one or more other devices of environment 300 to support the operations performed by those devices.

AAA 330 includes one or more devices, such as one or more server devices, that perform authentication, authorization, and/or accounting operations for communication sessions associated with user device 105. For example, AAA 330 may perform authentication operations for user device 105 and/or a user of user device 105 (e.g., using one or more credentials), may control access, by user device 105, to a service and/or an application (e.g., based on one or more restrictions, such as time-of-day restrictions, location restrictions, single or multiple access restrictions, read/write restrictions, etc.), may track resources consumed by user device 105 (e.g., a quantity of voice minutes consumed, a quantity of data consumed, etc.), and/or may perform similar operations.

OCS 335 includes one or more devices, such as one or more server devices, that perform real-time (e.g., continuous) billing operations based on service usage. OCS 335 may receive information identifying a radio frequency (RF) access signaling usage billing policy and/or an RF access signaling usage control policy. OCS 335 may determine whether RF access signaling usage of user device 105 satisfies one or more RF access signaling usage thresholds associated with the RF access signaling usage billing policy and/or the RF access signaling usage control policy. OCS 335 may cause PCRF 320 to provide the one or more RF access signaling usage thresholds to PGW 315. When user device 105 satisfies one or more of the thresholds, OCS 335 may provide billing information, information identifying other RF access signaling usage thresholds, or other information, to one or more devices (e.g., user device 105, PCRF 320, HSS 325, AAA 330, etc.). In some implementations, OCS 335 may control access, by user device 105, to a service and/or an application (e.g., based on one or more restrictions, such as time-of-day restrictions, location restrictions, single or multiple access restrictions, read/write restrictions, etc.), may track resources consumed by user device 105 (e.g., a quantity of voice minutes consumed, a quantity of data consumed, etc.), and/or may perform similar operations.

Network 340 includes one or more wired and/or wireless networks. For example, network 340 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
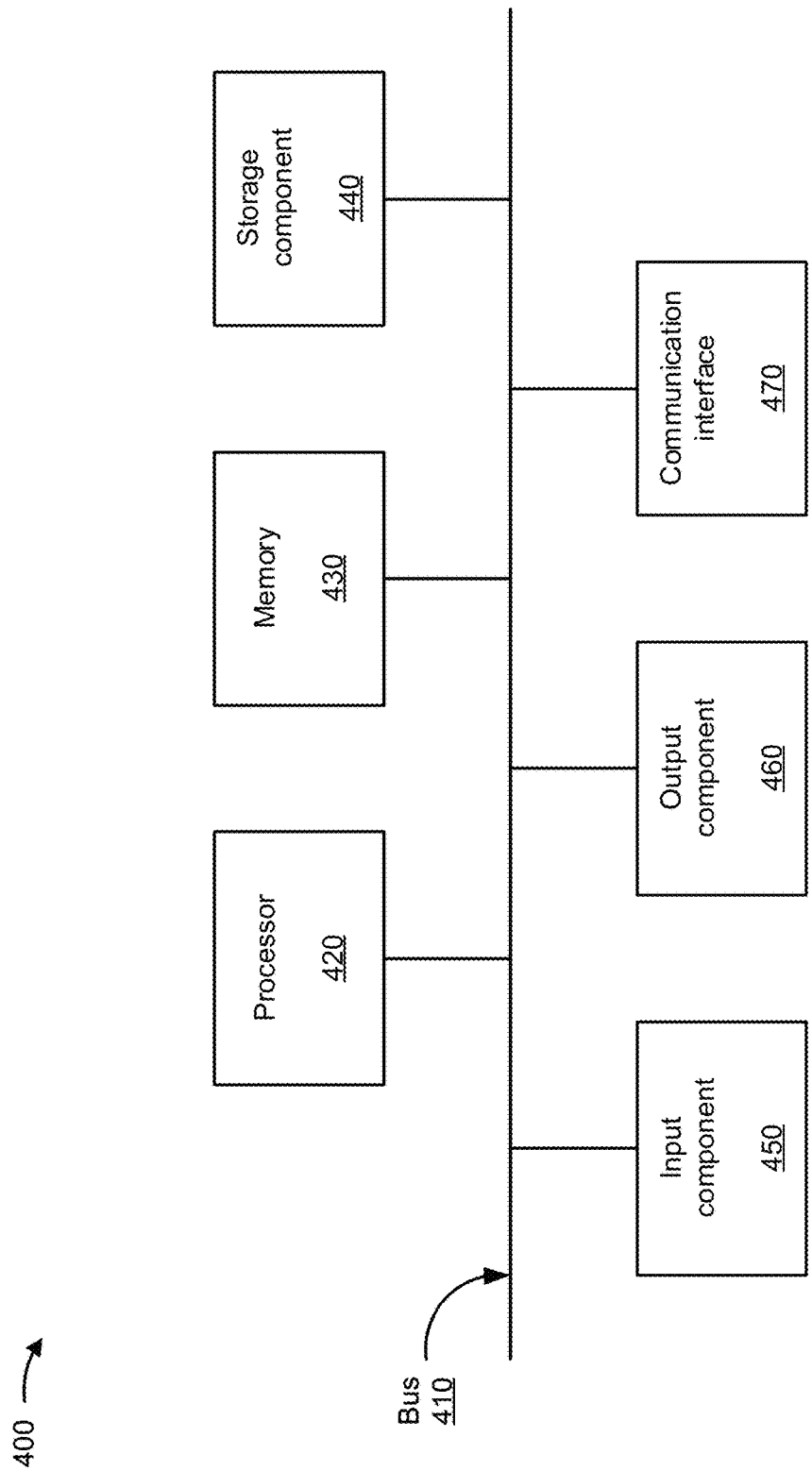
FIG. 4 is a diagram of example components of one or more devices of FIGS. 2 and 3.

FIG. 4 is a diagram of example components of a device 400. Device 400 may correspond to user device 105, base station 110, NSSF 205, NEF 210, AUSF 215, UDM 220, PCF 225, AF 230, AMF 235, SMF 240, UPF 245, MME 305, SGW 310, PGW 315, PCRF 320, HSS 325, AAA 330, and/or OCS 335. In some implementations, user device 105, base station 110, NSSF 205, NEF 210, AUSF 215, UDM 220, PCF 225, AF 230, AMF 235, SMF 240, UPF 245, MME 305, SGW 310, PGW 315, PCRF 320, HSS 325, AAA 330, and/or OCS 335 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flow chart of an example process 500 for providing indications of network connectivity status to a user device. In some implementations, one or more process blocks of FIG. 5 may be performed by a device, such as a SMF (e.g., SMF 240) for 5G networks and a PGW (e.g., PGW 315) for 4G networks. In some implementations, one or more process blocks of FIG. 5 may be performed by another device or a group of devices separate from or including the device, such as a user device (e.g., user device 105), a NSSF (e.g., NSSF 205), and/or a UPF (e.g., UPF 245).

As shown in FIG. 5, process 500 may include receiving, from a user device, a connection request for connecting to a core network associated with the device (block 510). For example, the device (e.g., using processor 420, communication interface 470, and/or the like) may receive, from a user device, a connection request for connecting to a core network associated with the device, as described above in connection with FIGS. 1A-3.

As further shown in FIG. 5, process 500 may include determining, based on receiving the connection request, that a usage associated with the user device exceeds a usage threshold (block 520). For example, the device (e.g., using processor 420, memory 430, and/or the like) may determine, based on receiving the connection request, that a usage associated with the user device exceeds a usage threshold, as described above in connection with FIGS. 1A-3.

As further shown in FIG. 5, process 500 may include generating a first network connectivity status indicator based on determining that the usage associated with the user device exceeds the usage threshold (block 530). For example, the device (e.g., using processor 420, storage component 440, and/or the like) may generate a first network connectivity status indicator based on determining that the usage associated with the user device exceeds the usage threshold, as described above in connection with FIGS. 1A-3.

As further shown in FIG. 5, process 500 may include providing, to the user device, information indicating the first network connectivity status indicator, wherein the information indicating the first network connectivity status indicator is to cause the user device to display the first network connectivity status indicator (block 540). For example, the device (e.g., using processor 420, memory 430, communication interface 470, and/or the like) may provide, to the user device, information indicating the first network connectivity status indicator, as described above in connection with FIGS. 1A-3. In some implementations, the information indicating the first network connectivity status indicator may cause the user device to display the first network connectivity status indicator.

Process 500 may include additional implementations, such as any single implementation or any combination of implementations described below and/or described with regard to any other process described herein.

In some implementations, the device may receive updated usage associated with the user device after providing the information indicating the first network connectivity status indicator to the user device; may determine that the updated usage associated with the user device fails to exceed the usage threshold; may generate a second network connectivity status indicator based on determining that the updated usage associated with the user device fails to exceed the usage threshold; and may provide information indicating the second network connectivity status indicator to the user device, where the information indicating the second network connectivity status indicator is to cause the user device to display the second network connectivity status indicator.

In some implementations, the first network connectivity status indicator may include information indicating that network data speeds for the user device with the core network is throttled. In some implementations, the usage threshold may be associated with an account associated with the user device. In some implementations, the device may be a packet data network gateway (PGW), and/or a session management function (SMF) device. In some implementations, the information indicating the first network connectivity status indicator may be included in an active default bearer non-access stratum (NAS) message, and/or a protocol data unit (PDU) session resource message.

In some implementations, the device may receive, from another device associated with the core network, information indicating whether the usage associated with the user device satisfies the usage threshold, and, when determining whether the usage associated with the user device satisfies the usage threshold, the device may determine whether the usage associated with the user device satisfies the usage threshold based on the information received from the other device.

In some implementations, the device may determine, based on receiving a connection request, whether a usage associated with the user device satisfies (e.g., exceeds) a usage threshold, and may generate one of a first network connectivity status indicator or a second network connectivity status indicator based on whether the usage associated with the user device satisfies the usage threshold, where the first network connectivity status indicator is generated when the usage associated with the user device fails to satisfy or exceed the usage threshold, and where the second network connectivity status indicator is generated when the usage associated with the user device satisfies the usage threshold. The device may provide, to the user device, information indicating the one of the first network connectivity status indicator or the second network connectivity status indicator, where the information indicating the one of the first network connectivity status indicator or the second network connectivity status indicator is to cause the user device to display the one of the first network connectivity status indicator or the second network connectivity status indicator.

In some implementations, the first network connectivity status indicator may include information indicating that network data speeds for the user device with the core network is not throttled, and the second network connectivity status indicator may include information indicating that the network data speeds for the user device with the core network is throttled.

In some implementations, the first network connectivity status indicator may include a first protocol configuration option (PCO) container value, and the second network connectivity status indicator may include a second PCO container value, where the first PCO container value is different than the second PCO container value. In some implementations, the first PCO container value may indicate that network data speeds for the user device with the core network is not throttled, and the second PCO container value may indicate that the network data speeds for the user device with the core network is throttled.

In some implementations, the device may determine that the usage associated with the user device satisfies the usage threshold after providing the information indicating the one of the first network connectivity status indicator or the second network connectivity status indicator to the user device, and may provide information indicating the second network connectivity status indicator to the user device based on determining that the usage associated with the user device satisfies the usage threshold.

In some implementations, when the core network is a fourth generation (4G) network or a fifth generation (5G) option 3x network, the device may be a packet data network gateway (PGW), and when the core network is a 5G network, the device may be a session management function (SMF) device. In some implementations, the information indicating the one of the first network connectivity status indicator or the second network connectivity status indicator may be included in a non-access stratum (NAS) message.

In some implementations, the device may receive updated usage associated with the user device after providing the information indicating the one of the first network connectivity status indicator or the second network connectivity status indicator to the user device, may determine that the updated usage associated with the user device exceeds the usage threshold, and may provide information indicating the second network connectivity status indicator to the user device based on determining that the updated usage associated with the user device exceeds the usage threshold, where the information indicating the second network connectivity status indicator is to cause the user device to display the second network connectivity status indicator.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device associated with a core network and from a user device, a connection request for connecting to the core network;
   determining, by the device and based on receiving the connection request, whether a usage associated with the user device satisfies a usage threshold;
   generating, by the device, one of a first network connectivity status indicator or a second network connectivity status indicator based on whether the usage associated with the user device satisfies the usage threshold,
      wherein the first network connectivity status indicator is generated when the usage associated with the user device fails to satisfy the usage threshold,
         the first network connectivity status indicator includes a first protocol configuration option (PCO) container value, and
      wherein the second network connectivity status indicator is generated when the usage associated with the user device satisfies the usage threshold,
         the second network connectivity status indicator includes information indicating that network data speeds for the user device with the core network is reduced or throttled, and
         the second network connectivity status indicator includes a second PCO container value,
            the first PCO container value being different than the second PCO container value; and
   providing, by the device and to the user device, information indicating the one of the first network connectivity status indicator or the second network connectivity status indicator,
      wherein the information indicating the one of the first network connectivity status indicator or the second network connectivity status indicator is to cause the user device to display the one of the first network connectivity status indicator or the second network connectivity status indicator.

2. The method of claim 1, further comprising:
   determining that the usage associated with the user device satisfies the usage threshold after providing the information indicating the one of the first network connectivity status indicator or the second network connectivity status indicator to the user device; and
   providing information indicating the second network connectivity status indicator to the user device based on determining that the usage associated with the user device satisfies the usage threshold.

3. The method of claim 1, wherein the device is a packet data network gateway (PGW) or a session management function (SMF) device.

4. The method of claim 1, wherein the information indicating the one of the first network connectivity status indicator or the second network connectivity status indicator is included in a non-access stratum (NAS) message.

5. The method of claim 1, further comprising:
   receiving, from another device associated with the core network, information indicating whether the usage associated with the user device satisfies the usage threshold; and
   wherein determining whether the usage associated with the user device satisfies the usage threshold includes:
      determining whether the usage associated with the user device satisfies the usage threshold based on the information received from the other device.

6. The method of claim 1, wherein the usage threshold is associated with an account associated with the user device.

7. The method of claim 1, where when the core network is a fourth generation (4G) network or a fifth generation (5G) option 3x network, the device is a packet data network gateway (PGW), and
   wherein when the core network is a 5G network, the device is a session management function (SMF) device.

8. A device, comprising:
   a communication interface;
   one or more memories; and
   one or more processors, communicatively coupled to the one or more memories, to:
      receive, from a user device, a connection request for connecting to a core network associated with the device;
      determine, based on receiving the connection request, that a usage associated with the user device exceeds a usage threshold;
      generate a first network connectivity status indicator based on determining that the usage associated with the user device exceeds the usage threshold,
         wherein the first network connectivity status indicator includes information indicating that network data speeds for the user device with the core network is reduced; and
      provide, to the user device, information indicating the first network connectivity status indicator,
         wherein the information indicating the first network connectivity status indicator is to cause the user device to display the first network connectivity status indicator, and
         wherein the information indicating the first network connectivity status indicator is included a protocol data unit (PDU) session resource message.

9. The device of claim 8, wherein the one or more processors are further to:
   receive updated usage associated with the user device after providing the information indicating the first network connectivity status indicator to the user device;
   determine that the updated usage associated with the user device fails to exceed the usage threshold;

generate a second network connectivity status indicator based on determining that the updated usage associated with the user device fails to exceed the usage threshold; and provide information indicating the second network connectivity status indicator to the user device,
  wherein the information indicating the second network connectivity status indicator is to cause the user device to display the second network connectivity status indicator.

10. The device of claim 8, wherein the usage threshold is associated with an account associated with the user device.

11. The device of claim 8, wherein the device is one of:
a packet data network gateway (PGW), or
a session management function (SMF) device.

12. The device of claim 8, wherein the one or more processors are further to:
receive, from another device associated with the core network, information indicating that the usage associated with the user device exceeds the usage threshold, and
  wherein the one or more processors, when determining that the usage associated with the user device exceeds the usage threshold, are to:
    determine that the usage associated with the user device exceeds the usage threshold based on the information received from the other device.

13. The device of claim 8, where when the core network is a fourth generation (4G) network or a fifth generation (5G) option 3× network, the device is a packet data network gateway (PGW), and
  wherein when the core network is a 5G network, the device is a session management function (SMF) device.

14. The device of claim 8, wherein the one or more processors when providing the information, are to:
provide a radio resource control (RRC) connection reconfiguration message that includes the PDU session resource message.

15. A non-transitory computer-readable medium storing instructions, the instructions comprising:
one or more instructions that, when executed by one or more processors of a device, cause the one or more processors to:
  receive, from a user device, a connection request for connecting to a core network associated with the device;
  determine, based on receiving the connection request, whether a usage associated with the user device exceeds a usage threshold;
  generate one of a first network connectivity status indicator or a second network connectivity status indicator based on whether the usage associated with the user device exceeds the usage threshold,
    wherein the first network connectivity status indicator is generated when the usage associated with the user device fails to exceed the usage threshold,
      the first network connectivity status indicator includes a first protocol configuration option (PCO) container value, and
    wherein the second network connectivity status indicator is generated when the usage associated with the user device exceeds the usage threshold,
      the second network connectivity status indicator includes information indicating that network data speeds for the user device with the core network is reduced or throttled, and
      the second network connectivity status indicator includes a second PCO container value,
        the first PCO container value being different than the second PCO container value; and
  provide, to the user device, information indicating the one of the first network connectivity status indicator or the second network connectivity status indicator,
    wherein the information indicating the one of the first network connectivity status indicator or the second network connectivity status indicator is to cause the user device to display the one of the first network connectivity status indicator or the second network connectivity status indicator.

16. The non-transitory computer-readable medium of claim 15, wherein the instructions further comprise:
one or more instructions that, when executed by the one or more processors, cause the one or more processors to:
  receive updated usage associated with the user device after providing the information indicating the one of the first network connectivity status indicator or the second network connectivity status indicator to the user device;
  determine that the updated usage associated with the user device exceeds the usage threshold; and
  provide information indicating the second network connectivity status indicator to the user device based on determining that the updated usage associated with the user device exceeds the usage threshold,
    wherein the information indicating the second network connectivity status indicator is to cause the user device to display the second network connectivity status indicator.

17. The non-transitory computer-readable medium of claim 15, wherein:
when the core network is a fourth generation (4G) network or a fifth generation (5G) option 3× network, the device is a packet data network gateway (PGW), and
when the core network is a 5G network, the device is a session management function (SMF) device.

18. The non-transitory computer-readable medium of claim 15, wherein the information indicating the one of the first network connectivity status indicator or the second network connectivity status indicator is included in a non-access stratum (NAS) message.

19. The non-transitory computer-readable medium of claim 15, wherein the instructions further comprise:
one or more instructions that, when executed by the one or more processors, cause the one or more processors to:
  receive, from another device associated with the core network, information indicating whether the usage associated with the user device exceeds the usage threshold, and
  wherein the one or more instructions, that cause the one or more processors to determine whether the usage associated with the user device exceeds the usage threshold, further cause the one or more processors to:
    determine whether the usage associated with the user device exceeds the usage threshold based on the information received from the other device.

20. The non-transitory computer-readable medium of claim 15, wherein the usage threshold is associated with an account associated with the user device.

* * * * *